3,303,014
BENZYL POLYMETHYLENIMINECARBOTHIO-
LATES AND HERBICIDAL USE THEREOF
John J. D'Amico, Dunbar, W. Va., assignor to Monsanto
Company, St. Louis, Mo., a corporation of Delaware
No Drawing. Filed Apr. 22, 1966, Ser. No. 544,413
14 Claims. (Cl. 71—2.5)

This application is a continuation-in-part of co-pending application Serial No. 455,595, filed in the United States Patent Office May 13, 1965, now abandoned, which was in turn a continuation-in-part of application Serial No. 121,335, filed July 3, 1961, now U.S. Patent 3,224,861, December 21, 1965.

This invention relates to benzyl polymethyleniminecarbothiolates, as for example to benzyl 1-hexamethyleniminecarbothiolate, also named benzyl hexahydro-1H-azepine-1-carbothiolate, a valuable herbicide, which hereinafter will be designated as CP 24152 for convenience.

The herbicidal compositions of the invention are prepared by admixing the ester with a carrier material of the kind used and referred to in the art as a herbicidal adjuvant in order to provide formulations adapted for ready and efficient application in liquid or solid form. Solid compositions are preferably in the form of granules or dusts and are formulated by mixing the toxicant with a granular or finely-divided solid, as for example talc, clay, prophyllite, silica, and fuller's earth. Liquid compositions are prepared by admixing the active ingredient with a conventional liquid diluent media. The active ingredients are insoluble in water but they are soluble in common organic solvents. They may be dispersed directly in water or dissolved first in an organic solvent and then dispersed. Surfactants aid dispersion and wetting for which purpose there may be employed soft or hard sodium or potassium soaps, alkylated aromatic sodium sulfonates such as sodium dodecylbenzenesulfonate, or an amine salt of dodecylbenzenesulfonic acid, alkali metal salts of sulfated fatty alcohols, ethylene oxide condensation products of any of the following: alkyl phenols, tall oil, higher fatty acids, and higher alkyl mercaptans.

Pre-emergence herbicides are applied to the soil surface before the plants emerge. The toxicants may be applied to the soil conveniently in the form of a spray containing the active ingredients in a concentration within the range of 0.1–10% by weight. The amount required for effective control of vegetation will vary, but amounts within the range of ¼ to 60 pounds per acre comprise the useful range under most conditions.

As illustrative of the invention, the toxicant was applied as an aqueous spray to germinating seedlings of various plant species. The plant species included morning glory, wild oat, brome grass, rye grass, radish, sugar beets, foxtail, crab grass, pigweed, soybean, wild buckwheat, tomato, and sorghum. The active ingredient was emulsified in water and applied to seeded soil at 5 pounds per acre. About fourteen days after application of the toxicant, results were observed and recorded. The number of seeds emerging was converted to weighted herbicidal ratings based on average percent germination of any particular seed lot times an injury factor. This evened irregularities of herbicide ratings of seeds which varied in percent germination. The injury factor took into consideration any plants not expected to survive. Thus, phytotoxicity ratings were based on the number of plants which emerged and would survive as observed two weeks after planting. Herbicidal ratings were assigned by means of the following conversion scale:

Percent emergence:             Phytotoxicity rating
0–25 _____ Severe.
26–50 _____ Moderate.
51–75 _____ Slight.
76–100 _____ None.

The phytotoxicities are recorded below:

Table I

Active ingredient:          Results observed
CP 24152 __ General formative action. Severe phytotoxicity to brome grass, rye grass, sugar beets, foxtail, crab grass, pigweed, wild buckwheat, tomato, and sorghum; moderate phytotoxicity to morning glory, wild oats, and radish.

Replicated tests were carried out by surface application at 5, 1, and ¼ pounds per acre, respectively. The same plants were used as in Table I. The weather was cloudy and cool during the tests and this caused retarded growth. For this reason, observations were noted after three weeks or 21 days. Phytotoxicity ratings were obtained as described, severe phytotoxicity being designated 3; moderate, 2; slight, 1; and no phytotoxicity by 0. Ratings were assigned on the basis of the average from the replicated tests. The sum of the average herbicide or phytotoxicity ratings at the indicated rates as compared to those from identical tests with benzyl 1-hexamethyleniminecarbodithioate (hereinafter designated as CP 24820) was as follows:

Table II

| Dosage, Lbs/Acre | Sum of Herbicide Ratings | |
|---|---|---|
| | CP 24152 | CP 24820 |
| 5 | 32 | 13 |
| 1 | 13 | 4 |
| ¼ | 7 | 2 |

The importance of six methylene groups in the heterocyclic ring is brought out by comparing total phytotoxicities to corresponding piperidine derivatives. Typical results are recorded below from surface application of the test chemical.

Table III

| | Lbs./Acre | Total Phytotoxicity |
|---|---|---|
| Benzyl 1-hexamethyleniminecarbothiolate | 1 | 13 |
| Benzyl 1-hexamethyleniminecarbodithioate | 1 | 4 |
| Benzyl 1-piperidinecarbodithioate | 1 | 0 |
| Benzyl 1-hexamethyleniminecarbothionate | 5 | 13 |
| Benzyl 1-piperidinecarbothionate | 25 | 11 |

Greater efficiency results from incorporating the toxicants into the top layer of soil. Results from comparative tests of CP 24152 and CP 24820 from incorporating the toxicants into the cover soil are recorded in Table IV.

Table IV

| Test Plant | Herbicide Rating of CP 24152, 5 and 1 lb./Acre | | Herbicide Rating of CP 24820, 5 and 1 lb./Acre | |
|---|---|---|---|---|
| | 5 | 1 | 5 | 1 |
| Morning glory | 0 | 0 | 0 | 0 |
| Wild oat | 3 | 3 | 3 | 2 |
| Brome grass | 3 | 1 | 1 | 0 |
| Rye grass | 3 | 2 | 3 | 0 |
| Radish | 2 | 0 | 1 | 1 |
| Sugar beet | 3 | 1 | 1 | 0 |
| Cotton | 1 | 0 | 0 | 0 |
| Corn | 3 | 0 | 0 | 0 |
| Foxtail | 3 | 3 | 1 | 0 |
| Barnyard grass | 3 | 3 | 3 | 3 |
| Crab grass | 3 | 3 | 3 | 0 |
| Pigweed | 3 | 3 | 2 | 1 |
| Soybean | 0 | 0 | 0 | 0 |
| Wild buckwheat | 3 | 0 | 0 | 0 |
| Tomato | 3 | 0 | 1 | 0 |
| Sorghum | 3 | 3 | 3 | 1 |
| Rice | 3 | 2 | 0 | 0 |

It was observed that high phytotoxicity to barnyard grass of CP 24152 was accompanied by low phytotoxicity to rice. However, the presence of another methylene in the heterocyclic ring increased both the phytotoxicity to barnyard grass and the margin of safety to rice. By margin of safety is meant the factor by which the minimum dosage giving essentially complete control of barnyard grass can be multiplied without any injury to rice.

As illustrative of the selective properties possessed by the compounds of this invention, seeds of rice and barnyard grass were sown at one-half inch depth in Memphis silt loam in small square pots. The herbicidal compositions were applied by means of a belt sprayer at various dosages. One-half inch of overhead irrigation was initially applied, and subirrigation was used for subsequent watering requirements. The planted pots were next placed in a greenhouse maintained at about 75° F. Observations on the germination inhibition were made on the 17th day after planting. The number of seeds emerging times an injury or vigor factor gave an indication of the effectiveness of the compound. The injury factor took into consideration any plants not expected to survive and evened irregularities of ratings on seeds which varied in percent germination. Thus, ratings were based on the number of plants which emerged and would survive as observed 17 days after planting. Herbicidal ratings were assigned by means of the conversion scale previously described. The following phytotoxicity ratings were obtained and are the average of three replications:

Table V

| Active Ingredient | Lbs./Acre | Herbicide Ratings | |
|---|---|---|---|
| | | Rice | Barnyard Grass |
| Benzyl octahydro-1H-azonine-1-carbothiolate | 16 | 0.3 | 3.0 |
| | 8 | 0 | 3.0 |
| | 4 | 0 | 3.0 |
| | 2 | 0 | 3.0 |
| | 1 | 0 | 3.0 |
| | ½ | 0 | 2.5 |
| Benzyl hexahydro-1(2H)-azocinecarbothiolate | 16 | 0 | 3.0 |
| | 8 | 0 | 3.0 |
| | 4 | 0 | 3.0 |
| | 2 | 0 | 3.0 |
| | 1 | 0 | 3.0 |
| | ½ | 0 | 3.0 |
| | ¼ | 0 | 2.7 |
| Benzyl hexahydro-1H-azepine-1-carbothiolate | 16 | 1.0 | 3.0 |
| | 8 | 1.0 | 3.0 |
| | 4 | 0 | 3.0 |
| | 2 | 0 | 3.0 |
| | 1 | 0 | 3.0 |
| | ½ | 0 | 3.0 |
| | ¼ | 0 | 2.7 |

The above data demonstrate that several-fold safety on upland rice was obtained with the compounds of this invention. There was an eight-fold margin of safety without injury to rice when benzyl hexahydro-1H-azepine-1-carbothiolate was employed. The margin of safety was sixteen-fold or more when benzyl-octahydro-1H-azonine-1-carbothiolate was employed; and when benzyl hexahydro-1(2H)-azocinecarbothiolate was employed as the active ingredient, the margin of safety was thirty-two-fold or more.

Paddy-rice tests also pointed up the safety by use of the present compounds. Tests results (average of two replicates) showed complete control of barnyard grass at ½ pound per acre with all three compounds. However, slight phytotoxicity to rice at this concentration was observed with benzyl hexahydro-1H-azepine-1-carbothiolate whereas no injury was observed with either benzyl octahydro-1H-azonine-1-carbothiolate or benzyl hexahydro-1(2H)-azocinecarbothiolate. The latter was completely effective at ¼ pound per acre with no injury to rice.

The problem of controlling brome (Bromus tectorum) in wheat is a troublesome one. A compound which is effective must be one that will control brome without injury to wheat. As illustrative of the effectiveness of benzyl hexahydro-1(2H)-azocinecarbothiolate for control of brome, aluminum pans, perforated on the bottom, were filled with a standard soil preparation to a depth of ½ to ⅜ inch from the pan top. A counted number of seeds were scattered on the soil surface. The toxicant was sprayed on and thoroughly mixed with the cover layer of soil. The seeds were covered with the treated soil and placed in a greenhouse bench and watered from below as needed.

The seeds normally germinated and emerged in three to five days, and observations on the germination inhibition were made on the 14th day after planting. Benzyl hexahydro-1(2H)-azocinecarbothiolate exerted only slight toxicity to wheat at one pound per acre and completely controlled brome at this rate. Five pounds per acre of benzyl hexahydro-1H-azepine-1-carbothiolate gave effective control, but control was only slight at one pound per acre. Preparation of the toxicants is illustrated below:

To a stirred solution of 30.0 grams (0.3 mole) of 1-hexamethylenimine, 50 ml. of water, and 40 grams (0.25 mole) of 25% sodium hydroxide at 0°–7° C. was added in 30 minutes 19.0 grams (0.27 mole) of 85% carbonoxysulfide. There was then added in one portion 31.6 grams (0.25 mole) of benzyl chloride. The stirred reaction mixture was maintained an hour at 5°–10° C., a second hour at 10°–15° C., a third hour at 15°–20° C., a fourth hour at 20°–25° C., and 20 hours at 25°–30° C. Thereupon the reaction mixture was extracted with 400 ml. of ethyl ether, the ether solution washed with water until neutral to litmus and dried over sodium sulfate. The ether was removed in vacuo at a maximum temperature of 80°–90° C./1–2 mm. Benzyl hexahydro-1H-azepine-1-carbothiolate was obtained as an amber liquid in 90.5% yield. Analysis gave 5.5% nitrogen and 13.5% sulfur compared to 5.6% nitrogen and 12.9% sulfur calculated for $C_{14}H_{19}NOS$.

To a stirred charge comprising 183 grams (1.62 mole) of heptamethylenimine, 375 ml. of water, and 200 grams (1.25 mole) of 25% sodium hydroxide was added at 5°–10° C., over a period of 70 minutes, 97 grams (1.375 mole) of 85% carbonoxysulfide. Then 158.3 grams (1.25 mole) of benzyl chloride was added in one portion and the mixture maintained an hour at 5°–10° C., a second hour at 10°–15° C., a third hour at 15°–20° C., a fourth hour at 20°–25° C., and 20 hours at 25°–30° C. Thereupon there was added 400 ml. of water and one liter of ethyl ether and the mixture stirred for 15 minutes. The top organic layer was washed with water until neutral and dried over sodium sulfate. The ether was removed in vacuo at a maximum temperature of 80°–90° C./1–2 mm. Benzyl hexahydro-1(2H)-azocinecarbothiolate was obtained in 99% yield as an amber liquid analyzing 5.18% nitrogen and 12.20% sulfur compared to 5.32% nitrogen and 12.17% sulfur calculated for $C_{15}H_{21}NOS$.

A slurry of 12.8 grams (0.1 mole) of octamethylenimine in 500 ml. of ethyl ether and 14 grams of potassium carbonate was prepared. The slurry was stirred while 18.7 grams (0.1 mole) of benzyl chlorothiolformate was added dropwise at 5°–15° C. Stirring was continued at 25°–30° C. for 24 hours, then 500 ml. of water were added. After stirring an additional 15 minutes, the separated ether layer was washed with water until neutral to litmus and dried over sodium sulfate. The ether was removed in vacuo at a maximum temperature of 80°–90° C./1–2 mm. The yield of benzyl octahydro-1H-azonine-1-carbothiolate was 94%. On standing at room temperature for several days, a solid resulted melting at 41°–42° C. Analysis gave 4.91% nitrogen and 11.54% sulfur compared to 5.05% nitrogen and 11.56% sulfur calculated for $C_{16}H_{23}NOS$.

The new toxicants may be formulated as emulsifiable concentrates by dissolving the toxicant and a surfactant in a suitable organic solvent. Petroleum fractions make satisfactory, economical herbicidal adjuvants and readily lend themselves to emulsification in water where that is desired. Generally, the surfactant will comprise only a small proportion of the composition, say 0.1–15% by weight of the toxicant. Solution of the toxicant in organic solvents containing small amounts of surfactant provide versatile herbicidal compositions useful for direct application to soil or for preparing aqueous sprays. A suitable formulation comprises 45.47 parts by weight heavy aromatic naphtha, 5.0 parts by weight surfactant, and 49.53 parts by weight toxicant. However, granular formulations on either organic or inorganic solid carriers are advantageous for dropping into rice paddies. The compounds of this invention control all of the various barnyard grasses and especially *Echinochloa crusgalli*.

The term "surfactant" is used as in volume II of Schwartz, Perry and Bersch's, "Surface Active Agents and Detergents" (1958, Interscience Publishers, Inc., New York), in place of the expression "emulsifying agent" to connote generically the various "emulsifying agents," "dispersing agents," "wetting agents," and "spreading agents" that are adapted to be admixed with the active compounds of this invention in order to secure better wetting and spreading of the compound in water vehicle or carrier in which it is insoluble through lowering the surface tension of the water (see also Frear, "Chemistry of Insecticides, Fungicides and Herbicides," second edition, page 280). These surfactants include the well-known capillary-active substances which may be anion-active (or anionic), cation-active (or cationic), or non-ionizing (or non-ionic), which are described in detail in volumes I and II of Schwartz, Perry and Bersch's "Surface Active Agents and Detergents" (1958, Interscience Publishers, Inc., New York), and also in the November 1947 issue of Chemical Industries (pages 811–824) in an article entitled, "Synthetic Detergents," by John W. McCutcheon and also in the July, August, September, and October 1952 issues of Soap and Sanitary Chemicals under the title, "Synthetic Detergents."

The preferred surfactants are the water-soluble anionic surface-active agents and the water-soluble non-ionic surface-active agents set forth in U.S. Patent No. 2,846,398 (issued August 5, 1958). In general it is preferred that a mixture of water-soluble anionic and water-soluble non-ionic surfactants be employed.

It is intended to cover all changes and modifications of the examples of the invention herein chosen for purposes of disclosure which do not constitute departures from the spirit and scope of the invention.

What is claimed is:

1. A compound of the formula

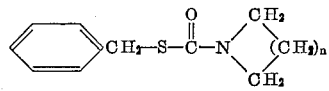

where $n$ is an integer at least 4 but not more than 6.

2. The compound of claim 1 where $n$ is 4.
3. The compound of claim 1 where $n$ is 5.
4. The compound of claim 1 where $n$ is 6.
5. The method of destroying undesired vegetation which comprises applying to the soil medium before the plants to be destroyed emerge a phytotoxic concentration of a compound of the formula

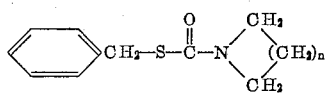

where $n$ is an integer 5 or 6.

6. The method of claim 5 where $n$ is 5.
7. The method of claim 5 where $n$ is 6.
8. The method of claim 5 where the undesired vegetation includes barnyard grass seeds and seedlings and rice is growing in the soil medium, the concentration being phytotoxic to barnyard grass but not to rice.
9. The method of claim 8 where $n$ is 5.
10. The method of claim 5 where the soil contains germinating seeds and seedlings of *Bromus tectorum*.
11. The method of claim 10 where $n$ is 5.
12. A herbicidal composition comprising a petroleum hydrocarbon solvent containing a surfactant and a herbicidally effective amount of a compound of the formula

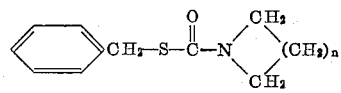

where $n$ is an integer 5 or 6.

13. The composition of claim 12 where $n$ is 5.
14. The composition of claim 12 where $n$ is 6.

References Cited by the Examiner

UNITED STATES PATENTS

| | | | |
|---|---|---|---|
| 2,187,719 | 1/1940 | Williams | 260—239 |
| 2,992,091 | 7/1961 | Harman et al. | 71—2.6 |
| 3,078,153 | 2/1963 | Harman et al. | 71—2.5 |
| 3,198,786 | 8/1965 | Tilles | 71—2.5 X |

LEWIS GOTTS, *Primary Examiner.*

JAMES O. THOMAS, *Examiner.*